United States Patent [19]
Andris

[11] Patent Number: 5,014,881
[45] Date of Patent: May 14, 1991

[54] METERING AND SPRAY PUMP FOR LIQUID AND LOW-VISCOSITY SUBSTANCES

[76] Inventor: Raimund Andris, Tannhörnle 9, D-7730 Villingen-Schwenningen 22, Fed. Rep. of Germany

[21] Appl. No.: 229,302

[22] Filed: Aug. 5, 1988

[30] Foreign Application Priority Data

Aug. 28, 1987 [DE] Fed. Rep. of Germany ....... 3728770

[51] Int. Cl.⁵ .............................................. B67D 5/08
[52] U.S. Cl. .................................... 222/207; 222/211; 222/214; 222/321; 222/383
[58] Field of Search ............... 222/207, 209, 211–213, 222/214, 383, 387, 494

[56] References Cited

U.S. PATENT DOCUMENTS

| 3,124,275 | 3/1964 | Lake | 222/321 |
| 4,347,953 | 9/1982 | Bauer | 222/207 |
| 4,589,573 | 5/1986 | Tada | 222/214 X |
| 4,732,549 | 3/1988 | von Schuckmann | 222/211 X |
| 4,846,372 | 7/1989 | von Schuckmann | 222/209 X |
| 4,863,070 | 9/1989 | Andris | 222/383 X |

FOREIGN PATENT DOCUMENTS

3509178 9/1986 Fed. Rep. of Germany .
3616552 11/1987 Fed. Rep. of Germany ...... 222/207
1599744 10/1981 United Kingdom .

*Primary Examiner*—Robert P. Olszewski
*Assistant Examiner*—Boris Milef
*Attorney, Agent, or Firm*—McGlew & Tuttle

[57] ABSTRACT

In order to create a metering and spray pump of high functional reliability, consisting of as few individual parts as possible and able to be produced with as low production costs, in particular assembly costs, as possible, in which the pumping member consists of an elastically-flexible bellows (4), which is arranged connectively between mutually movable, dimensionally stable housing parts (1,2), the bellows (4) has at its one end, as axial extension, a radially flexible, sleeve-like annular wall section (30), which encloses in sealing manner like a valve the circumferential surface (31) of a socket (24), in the form of a ring or pot, integrally molded onto the housing part (1) executing the pumping strokes. The other end of the bellows (4) is provided with an end wall section (17) which has at least one passage opening (18) and covers like a valve one or more outlet openings (16) of a housing end wall (12) of the second housing part (2) or forms the valve seat for a valve closing member which is molded onto a displacement body arranged in the bellows.

5 Claims, 6 Drawing Sheets

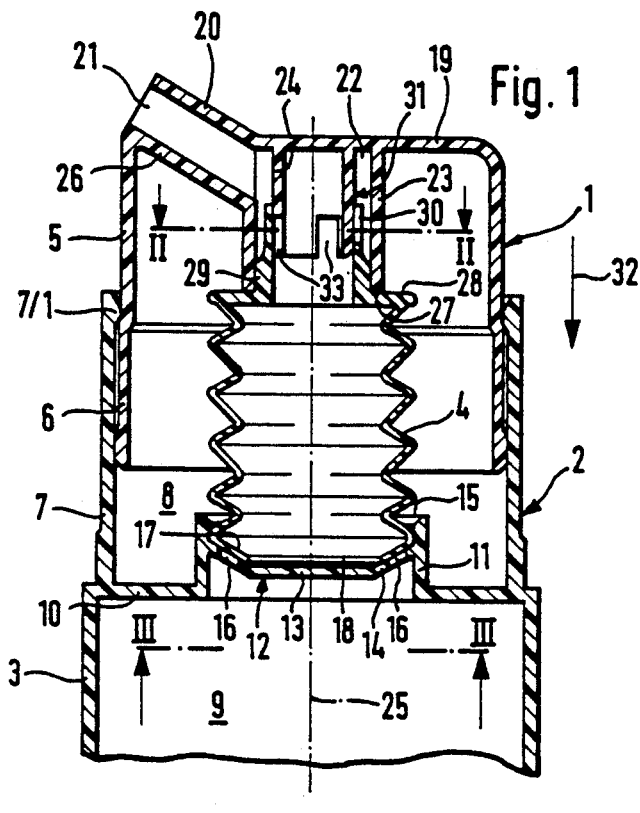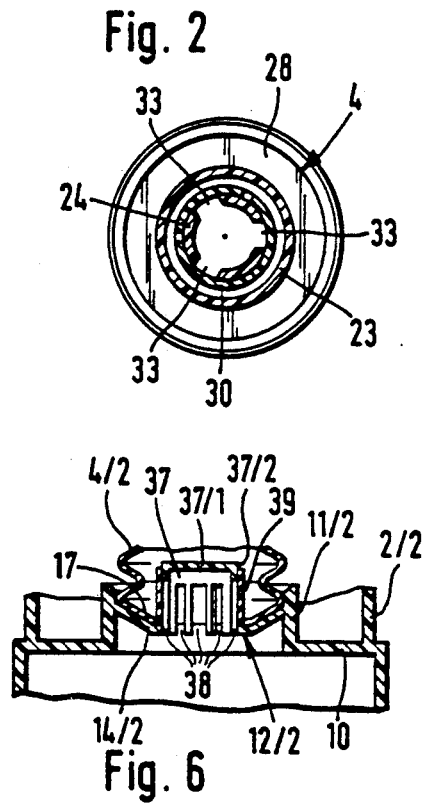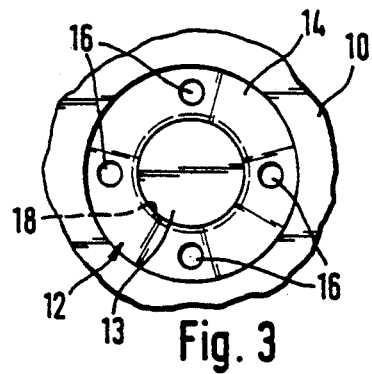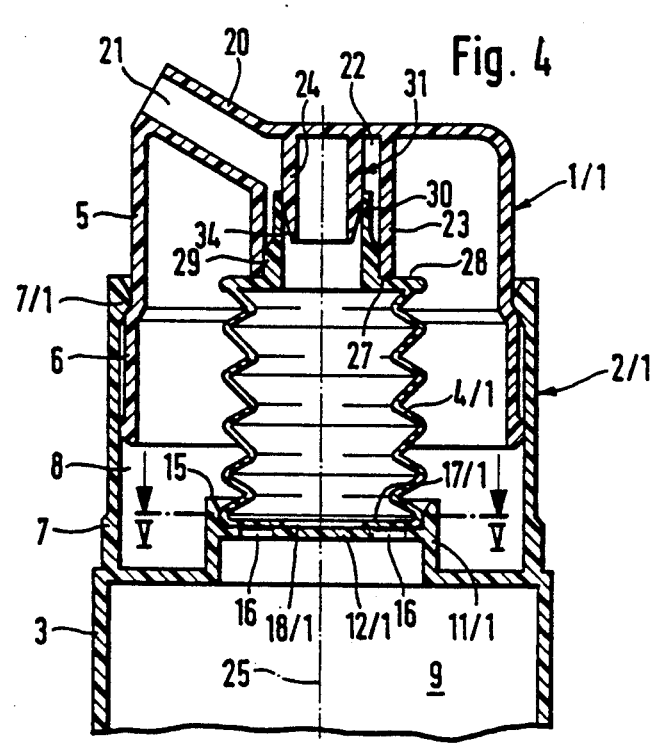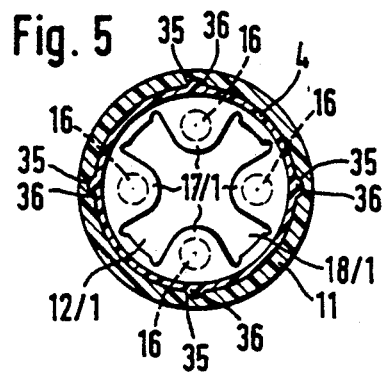

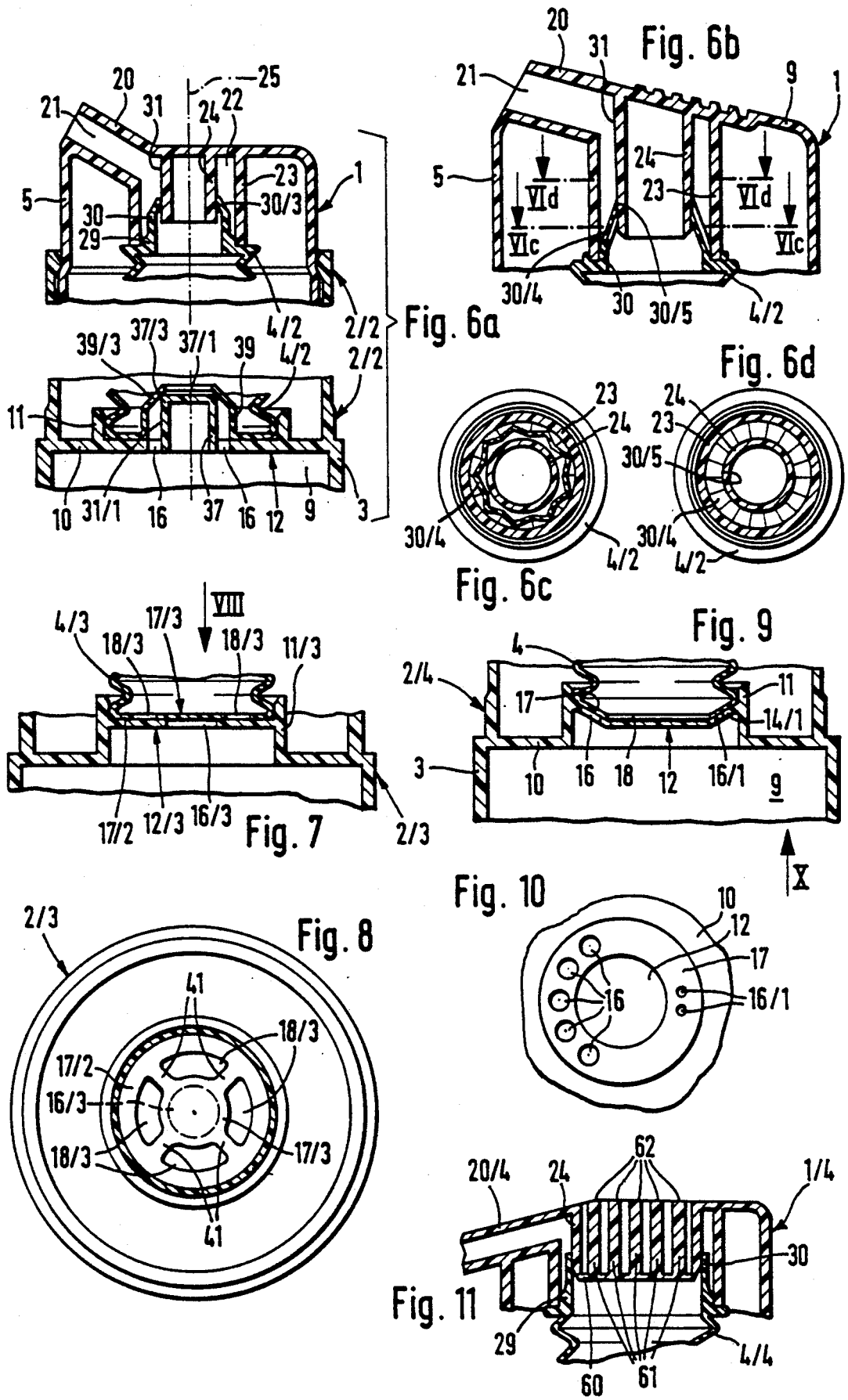

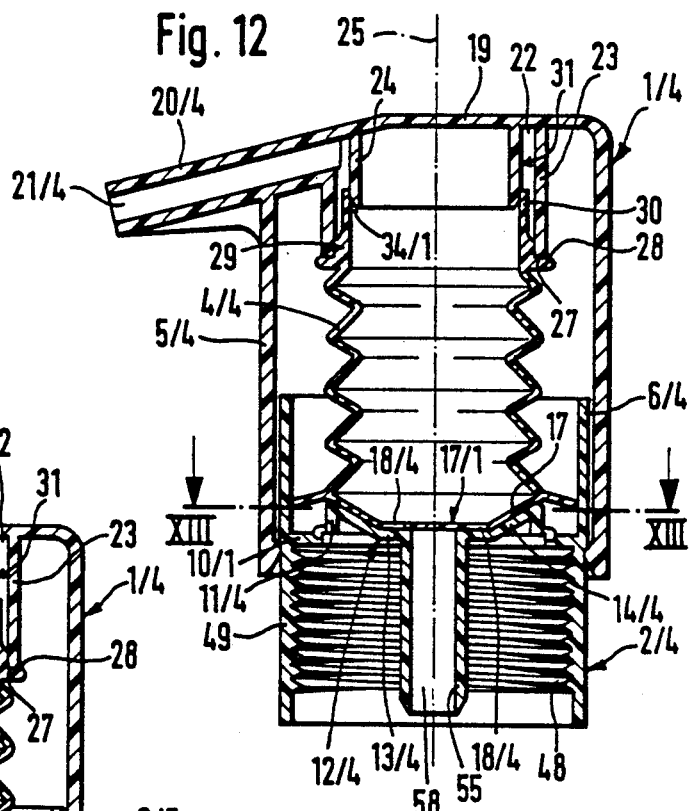
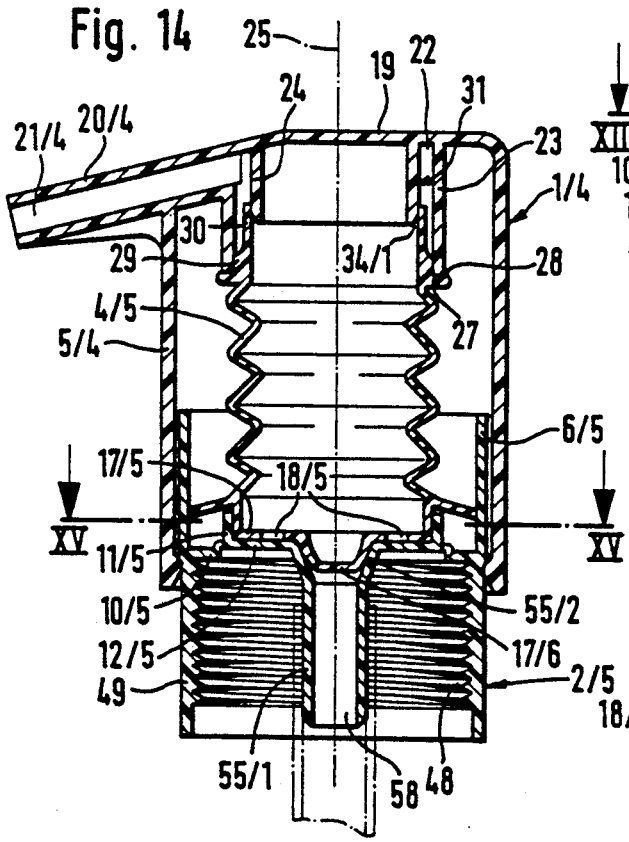
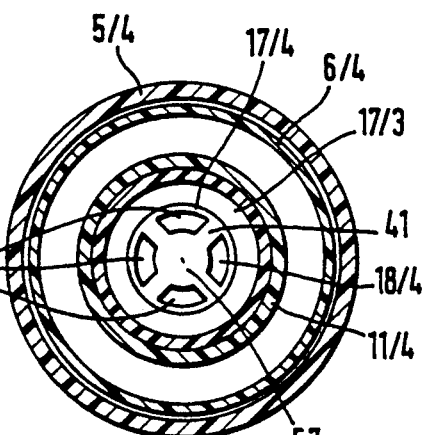
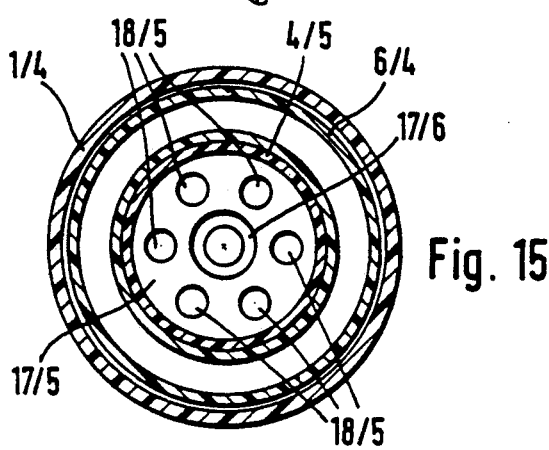

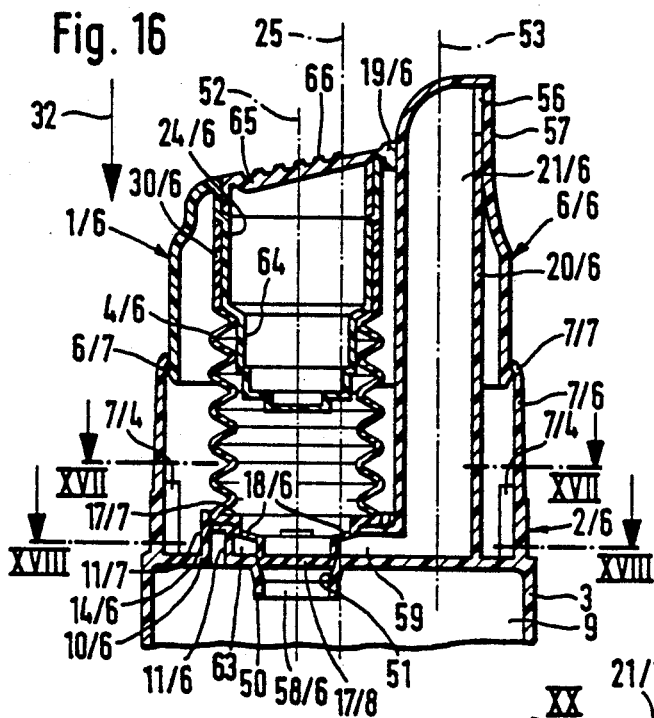
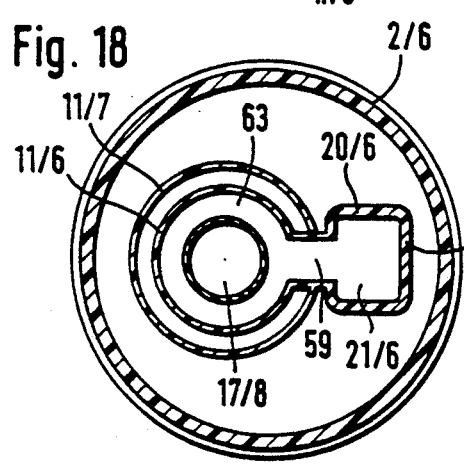
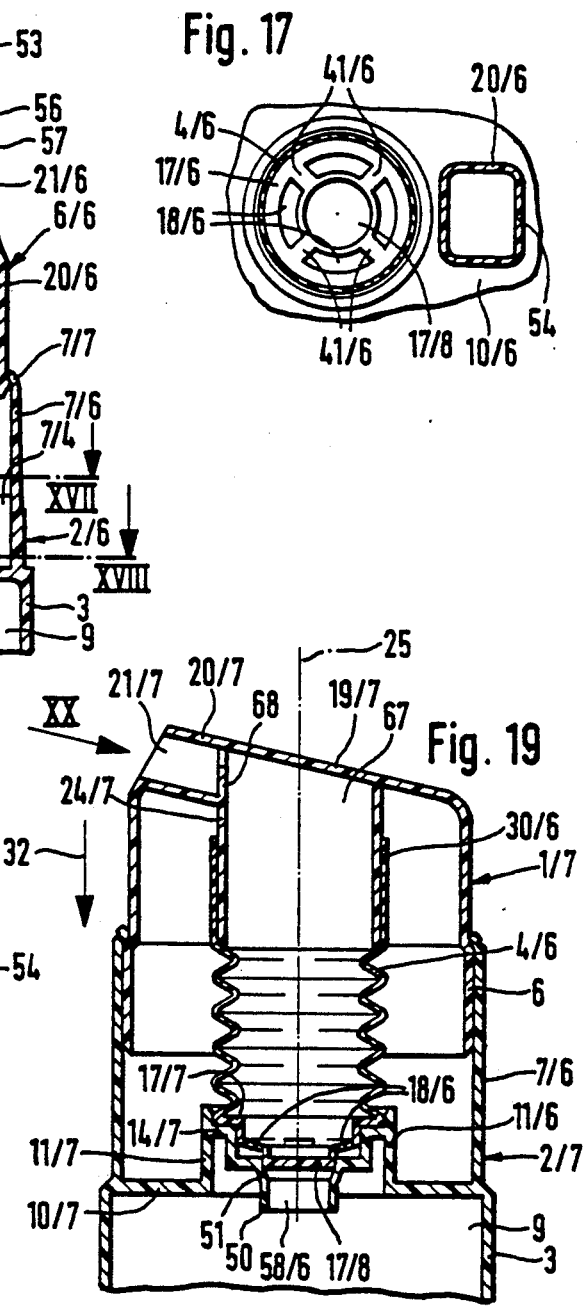
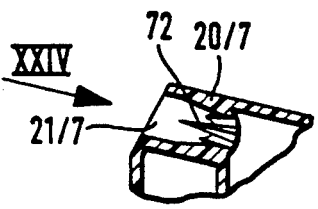

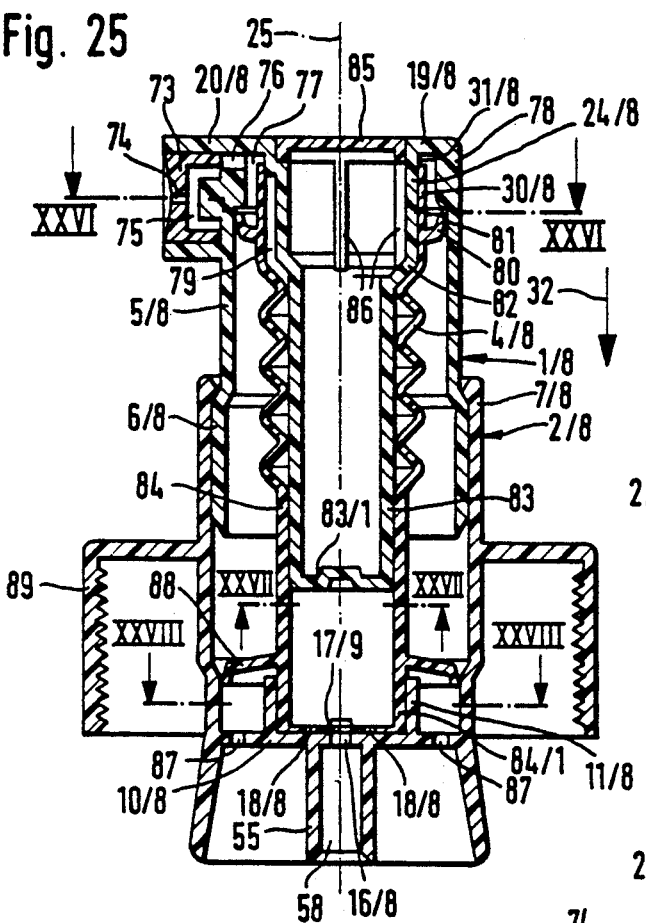
Fig. 25
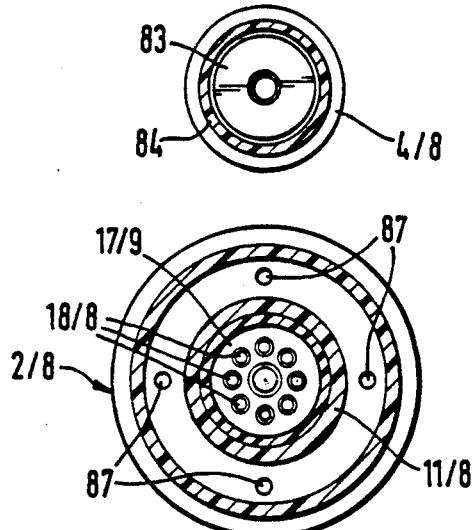
Fig. 27
Fig. 28
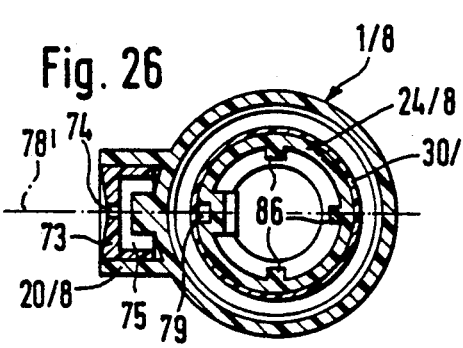
Fig. 26
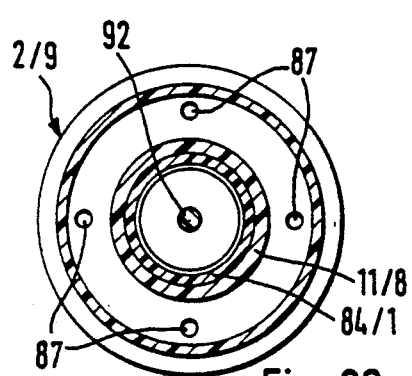
Fig. 30
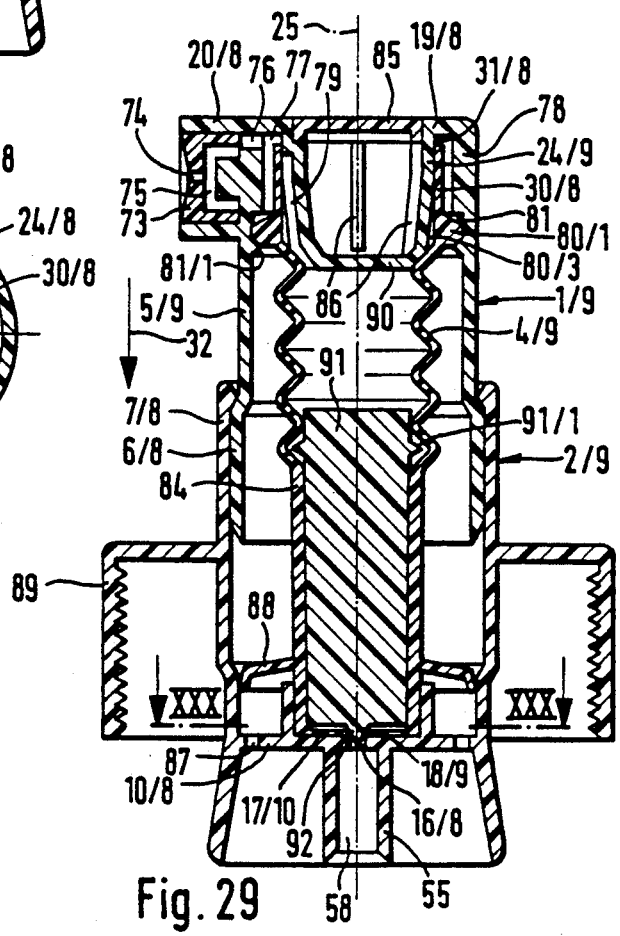
Fig. 29

METERING AND SPRAY PUMP FOR LIQUID AND LOW-VISCOSITY SUBSTANCES

The invention relates to a metering and spray pump for the delivery of metered quantities of liquid or low-viscosity substances from bottle-like to can-like containers having a bellows of flexible plastic, which is arranged connectively between two housing parts of dimensionally stable plastic which are telescopically movable with respect to each other in axial direction between two stroke positions and can be reset by the axial restoring spring forces of the bellows, there being arranged, at least at the end on the intake side of the bellows, a pump valve with a movable closing member, which automatically opens in intake direction and closes in return direction during the pumping strokes of the one housing part and of the bellows, and one housing part being provided with a delivery mouthpiece and one housing part being capable of being fitted onto the neck of the container by means of a connecting part or being provided with a molded-on container.

In the case of a known bellows metering pump for pasty substances (German Offenlegungsschrift 3,509,178) the two mutually axially displaceable housing parts are in each case provided with a transverse wall running at right angles to the axis of the bellows. These transverse walls have in each case on the sides facing each other annular ribs for the sealing reception of one end of the bellows each. In addition, bores with valve seat ring surfaces and the associated closing members of the pump valves are arranged in the two transverse walls. While the transverse wall of the housing part provided with the delivery mouthpiece is provided with a tube socket protruding into the bellows, for guidance of the closing member of the pump valve on the delivery side, the transverse wall of the other housing part has a tube socket arranged on the side opposite the bellows for guidance of the closing member of the pump valve on the intake side. At the same time, this tube socket is provided with a socket of tapered diameter for the fastening of an intake hose. Both housing parts have cylindrical guide walls which fit telescopically one into the other, the one housing part being provided in a region outside the transverse wall with an internal thread by which it can, for example, be screwed onto the external thread of a bottle neck or can neck. While the closing member of the pump valve on the intake side is accommodated loosely in the tube socket of the transverse wall on the container side by means of ribs arranged in star shape and is secured against falling out by claw-like fingers protruding into the inside of the bellows, the closing member of the pump valve on the delivery side has integrally molded-on spring members which push the closing member with low axial pressure onto the valve seat surface and hold it in closed position.

Consequently, both pump valves are provided with axially movable closing members which in each case have to be produced and assembled as separate individual parts and the valve seat ring surfaces of which have to be attached in each case to one of the two housing parts.

In order to be able to produce more cheaply such metering pumps, which are produced in very high numbers (millions) as mass-produced articles, by saving on individual parts and lowering the assembly costs, it has already been proposed to assign the movable closing members of the two pump valves, but in particular of the pump valve on the delivery side, a valve seat surface arranged on the bellows.

This has indeed achieved the effect that the housing part provided with the delivery mouthpiece can be produced as one piece and, once the closing member of the pump valve on the delivery side has been placed on the valve seat ring surface of the bellows, can be fitted as a finished part on the housing part, at the same time establishing its connection with the bellows, and in addition the advantage of better sealing qualities is achieved by the movable closing member consisting of a hard plastic being seated on the relatively soft valve seat of the bellows consisting of flexible plastic.

However, now as before these pump valves also require two axially movable closing members which have to be produced and assembled separately.

In the case of another known liquid pump with bellows (British Patent Specification No. 1,599,744), there is provided for manual operation of the bellows a pivoted lever which has a handle part and which presses against a closed end wall of the bellows. The opposite, open end of the bellows is provided with a substantially elliptical, planar flange wall, which is clamped between two housing walls, placed one on top of the other, and which has two sections cut free like tongues, which form the closing members of an intake valve and of a delivery valve. In this case, the one section covers an intake bore of the one housing part and the other section covers a radial groove which is made in a cover wall and connects the inside of the bellows to a delivery channel. Although the closing members of the two valves are integrally molded onto the one part of the bellows, this known liquid pump consists of a total of seven individual parts, which have to be produced separately and put together in expensive assembly work.

The same also applies to another embodiment of this known liquid pump, in which the open end of the bellows is provided with a bell-like, radially extensible extension, which encloses in sealing manner an inwardly protruding pipe socket of the housing and at the same time acts as movable closing member of the outlet valve. In the case of this embodiment, the valve on the intake side is arranged in the neck of the container especially designed for the purpose.

The invention is therefore based on the object of further simplifying, in terms of design and, in particular, production engineering, a metering and spray pump of the generic type, so that it can be produced still more cost-effectively with fewer individual parts and, in particular, with less assembly work and also to improve it functionally.

This object is achieved according to the invention in that the bellows has at its one end, as axial extension, a radially flexible, sleeve-like annular wall section, which encloses in sealing manner like a valve the circumferential surface of a socket, in the form of a ring or pot, integrally molded onto the housing part executing the pumping strokes, and in that the other end of the bellows is provided with an end wall section which has at least one passage opening and covers like a valve at least one outlet opening of a housing end wall of the second housing part or forms the valve seat for a valve closing member molded onto a displacement body arranged in the bellows.

The main advantage of the solution according to the invention is to be seen in that the pump can be used both for liquid and for pasty substances and in that, in its simplest embodiment, the complete pump consists only of three parts, namely the bellows and the two housing parts, which can moreover be put together in a very simple way to form a serviceable pump. At the two ends of the bellows, the parts in connection with the two housing parts can at the same time be designed as valve members, to be precise such that they can be brought readily into their operative position during the assembly of the three parts, so that they can establish the connection between the bellows on the one hand and the two housing parts on the other hand and, at the same time, can perform the valve functions of an intake valve and of an outlet valve. The design according to the invention of the connection on the delivery side between the bellows and the housing part with the delivery mouthpiece by means of integrally molded-on parts also makes possible a suitable mode of operation both for high working pressures, which are required, for example, for the generation of a spray effect, and for low working pressures, which are preferred in the case of pasty media.

The assembly of the metering and spray pump is reduced to the putting together of the bellows and of the two housing parts. This achieves a considerable reduction in production costs, which has a correspondingly high economic significance in cases where such metering and spray pumps are produced in very high numbers.

The present invention highlights advantageous developments of the end on the intake side of the bellows as valve part.

While the development including a valve part on the intake side in the form of an annular end wall section which is provided with a central passage opening and which bears in a sealing manner, in the return direction and flexibly raisably in the intake or delivery direction, against the outside of a housing end wall provided with one of more outlet openings, has the advantage that the end wall section forming the closing member has a relatively high closing force, which is of advantage in particular in the case of pasty media having a relatively low viscosity, the provision of tongue-shaped end wall sections as closing members is of advantage if the medium to be delivered has a somewhat higher viscosity, because the tongue-shaped end wall sections only have a relatively weak intrinsic closing force.

The developments of the invention wherein the outlet openings of the housing end wall arranged in the form of the plurality of round apertures, are of conical design or are provided as a central outlet opening surrounded by a plurality of segment-like passage openings, allow the valve functions to be arranged optimally with respect to the easy intake action and the secure closing of the outlet openings by the end wall sections of the bellows. The development in which the valve part is in the form of a hose socket intricately molded onto the annular end wall section, also represents a variant which ensures a secure closing of the intake valve in return direction in cases of relatively large intake cross-section.

The developments of the invention including a centrally arranged hose connection socket, the bore of which is covered flexibly in the sealing manner by a central bellows end wall section, which is surrounded by passage openings off set radially outward and the feature of the hose connection socket having a conical extension into which a nipple-like end wall projection of the bellows protrudes with tight contact, also provide the possibility of the metered dispensing of liquid media with the aid of the metering pump according to the invention, for example from a bottle or from a container integrally molded onto the housing part, there existing at the same time the advantage that a spray effect can be achieved in conjunction with other developments of the invention and with use of a spray nozzle.

The development of the invention also makes it possible, in the delivery of a pasty medium, to mix in with the latter during the delivery operation a second, differently colored medium, in the form of a stripe, which is in the same container but filled separately.

Other features of the invention relate to advantageous developments of the connection on the delivery side between the bellows and the movable housing part and its additional function as valve part.

The features of the invention including a radially flexible annular wall section of the bellows designed on the delivery side as an axial extension of an annular cooler, extending axially outside an annular shoulder and bearing in a sealing manner against the inside of a tube socket of the housing part, provided with a delivery mouth piece concentric to the bellows axis, also ensure at high working pressures a sealtight connection between the bellows and the housing part provided with the mouthpiece. The developments of the pump valve on the delivery side is advantageous in particular for the metered delivery of higher-viscosity, i.e. viscous pastes, because the necessary opening pressure is considerably lower than in the case of a flexible annular wall section which bears against a cylindrical annular surface over the entire circumference, the profile in wave form or zig-zag form requiring the smallest opening pressure.

The development of the invention including the seating of the tube socket at the end in a sealing manner on the annular shoulder of the bellows, ensures that this sealtight connection due to the coaxial guidance which is inevitably imparted on the annular wall section of the bellows by the pipe socket, is not impaired in any way during actuation of the metering pump, i.e. when pressure is exerted on the bellows, but is further increased. The development of the invention including the provision of the delivery mouthpiece, tube socket as well as a socket in the form of a ring or sleeve intricately molded onto the housing part, with a channel formed between the socket and the tube socket connected to the delivery channel of the delivery mouthpiece, produces not only advantages for the structural design of the injection mold of the housing part provided with the delivery mouthpiece, but also functional advantages. On the one hand, a good closing function of the annular wall section of the bellows bearing against the annular surface is achieved and, on the other hand, a uniform, annular opening is obtained during pressurization, i.e. the flexible annular wall section lifts off evenly all round from the annular surface against which the latter bears with a sealing effect between the individual delivery operations.

The last advantage mentioned is further increased by the features of the conicity of the annular surface or of an adjoining section enabling the medium inside the bellows to pass more easily between the annular surface and the annular wall section of the bellows and expand the latter.

Instead of the conicity, or in addition to it, the development by which it is achieved that, in the locations of the slit-shaped clearances, the pressurized medium in the region of the annular surface or directly alongside it can exert a direct radial pressure on the extensible annular wall section of the bellows and thus effect the radial expansion of the latter more easily.

Consequently, together with the developments of the invention mentioned above, the advantages achieved by the development can be combined in an optimum way and increased overall.

If the metering pump according to the invention is developed there is the possibility of delivering in metered manner pasty media with only a single pump valve arranged on the intake side of the bellows. In this case, it only has to be ensured that the strand of medium between the pump valve and the delivery opening of the delivery mouthpiece cannot flow back into the bellows during the suction stroke of the bellows. In the case of a lengthy delivery channel, if it does not have too great a cross-section and the medium to be delivered does not have too low a viscosity, this is readily ensured by the internal friction and the adhesion to the wall of the delivery channel. In order to achieve the same also in the case of relatively short delivery channels or short delivery mouthpiece, the development wherein the delivery channel of the delivery mouthpiece has a cross sectionally constricting restrictor element which increases the flow resistance of the through-flowing pasty medium, in particular in the return direction in the region of a section facing the socket.

The non-foldable extensible wall section of the bellows which is provided makes it possible, in interaction with the annular wall section forming the valve part on the delivery side, to generate a high enough pressure during implementation of the delivery stroke before the opening of the valve in the bellows on the delivery side for a liquid medium which passes out of the valve on the delivery side into a spray nozzle to be sprayed immediately. The disadvantage of known metering pumps that the spray effect only comes about gradually and liquid without spray effect leaves the spray nozzle as a laminar jet or dropwise at the beginning of the delivery operation, is completely avoided thereby.

The advantage is explained in more detail below with reference to the drawing, in which:

FIG. 1 shows a first embodiment of a metering and spray pump, in section;

FIG. 2 shows a section II—II from FIG. 1;

FIG. 3 shows a section III—III from FIG. 1;

FIG. 2a shows a section IIa—IIa from FIG. 1a;

FIG. 4 shows a second embodiment of a metering and spray pump, in section;

FIG. 5 shows a section V—V from FIG. 4;

FIG. 6 shows a further embodiment of the connection on the intake side between the bellows and the second housing part;

FIG. 6a shows further embodiments of the two connections between the bellows and the two housing parts, in section;

FIG. 6b shows a particular embodiment of the connection, designed on the delivery side as a pump valve, between the bellows and the movable housing part, in section;

FIG. 6c shows a section VIc—VIc from FIG. 6b;

FIG. 6d shows a section VId—VId from FIG. 6b;

FIG. 7 shows a further embodiment of the connection, designed on the intake side as a pump valve, between the bellows and the movable housing part, in section;

FIG. 8 shows a view VIII from FIG. 7;

FIG. 9 shows an additional embodiment of the connection, designed on the intake side as a pump valve, between the bellows and the movable housing part, in section;

FIG. 10 shows a view X from FIG. 9;

FIG. 11 shows another embodiment of the connection, designed on the delivery side as a pump valve, between the bellows and the movable housing part, in section;

FIG. 12 shows a further metering pump, suitable as a liquid pump, in section;

FIG. 13 shows a section XIII—XIII from FIG. 12;

FIG. 14 shows a further metering pump for the delivery of liquid media, in section, and FIG. 15 shows a section XV—XV from FIG. 14;

FIG. 16 shows a metering pump having a bellows which has a pump valve only on the intake side, in section;

FIG. 17 shows a section XVII—XVII from FIG. 16;

FIG. 18 shows a section XVIII—XVIII from FIG. 16;

FIG. 19 shows a metering pump having a delivery mouthpiece arranged at the upper end of the bellows and in direct connection with the interior of the bellows;

FIG. 20 shows a cross-sectional representation of the delivery mouthpiece in view XX from FIG. 19;

FIGS. 21 and 22 show further embodiments of the elements arranged inside the delivery mouthpiece for cross-sectional constriction;

FIG. 23 shows a further embodiment of the delivery mouthpiece, in section;

FIG. 24 shows a cross-sectional representation in view XXIV from FIG. 23;

FIG. 25 shows a spray pump suitable for the spraying of liquid media, in section;

FIG. 26 shows a section XXVI—XXVI from FIG. 25;

FIG. 27 shows a section XXVII—XXVII from FIG. 25;

FIG. 28 shows a section XXVIII—XXVIII from FIG. 25;

FIG. 29 shows the spray pump of FIG. 25 with a different connection on the delivery side between the bellows and the movable housing part and with a different displacement body in the bellows;

FIG. 30 shows a section XXX—XXX from FIG. 29.

Figure 1A:
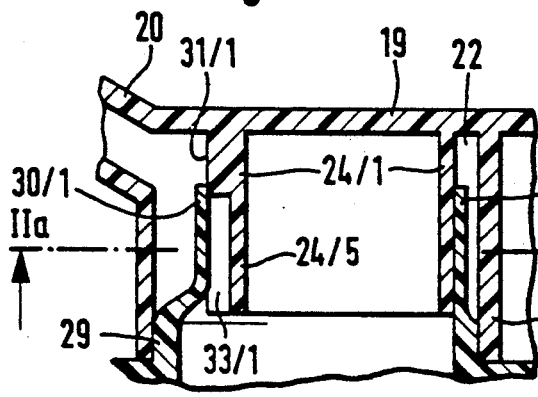
FIG. 1a shows another embodiment of the connection on the delivery side between the bellows and the movable housing part, in section.

While the embodiments of the metering and spray pump according to the invention which are represented in FIGS. 1, 10 and 16 to 21 are designed such that they are optimally suited in particular for the metered delivery of pasty media, in FIGS. 12 to 15, two embodiments of a metering and spray pump are represented which are also suited for the metered delivery of liquid media. In FIGS. 25 to 30, two exemplary embodiments of a spray pump are represented, by which liquid media can be sprayed.

In the following description of the figures, the same reference numerals are used in each case for the same or similar parts. The metering pumps represented in FIGS. 1 to 10, inclusive, consist in each case of a total of three individual parts, namely a first housing part 1, a second housing part 2, which is integrally connected to the container 3, and of a bellows 4. While the two housing parts 1 and 2 are in each case made of hard, dimensionally stable plastic, the bellows 4 consists of a rubberlike-flexible, soft plastic, which at the same time is capable of applying the restoring forces between the two housing parts 1 and 2 necessary for the pumping operation. The housing part 1 consists of a substantially cylindrical hollow body 5 having a guide section 6 of slightly widened diameter, extending approximately over half of its axial extent. This guide section 6 is guided with easy action and axially displaceably in a guide cylinder 7 of the housing part 2 between an annular rib 7/1 and an annular partition 10, the hollow space 8 of the guide cylinder being separated from the hollow space 9 of the container 3 by a partition wall 10. The partition 10 and the annular rib 7/1 thus form two stroke limitations for the housing part 1. In the center of this partition wall 10 there is a cylindrical back-up ring 11 with a housing end wall 12, which has a planar central section 13 and a conical annular section 14 around it. At the same time, the housing end wall 12 is arranged at such an axial distance away from the end face 15 on the delivery side of the back-up ring 11 that at least one fold of the bellows 4 is accommodated in centered manner by the back-up ring 11. The inside diameter of the back-up ring 11 is matched to the outside diameter of the bellows 4, to be precise such that the lowest fold of the bellows can be accommodated by the back-up ring 11 or easily pushed in, with an easy snug fit. As can be seen from FIGS. 1 and 3, the conical annular section 14 of the housing end wall 12 has four outlet openings 16 in the form of circular bores, which are covered by an in the same time way conical end wall section 17 of the bellows 4. This end wall section 17 extends in radial direction over the width of the conical annular wall section 14 and rests in sealing manner on the surface of the latter. In the center, the end wall section 17 consequently has a round passage opening 18, which has approximately the same diameter as the planar central section 13 of the housing end wall 12.

Since the bellows 4 and its end wall section 17, integrally molded onto it, consist of a rubberlike-flexible plastic, while the two housing parts 1 and 2 are in each case made of hard, dimensionally stable plastic, the end wall section 17 can perform the function of a movable valve member and, in interaction with the annular surface of the annular section 14 having the outlet openings 16, form the pump valve on the intake side.

The upper part of the hollow body 5 protruding from the guide cylinder 7 has a smaller diameter than the lower part 6 and is provided with an end wall 19. It has a delivery mouthpiece 20 with a delivery channel 21 directed radially and obliquely upward. This delivery channel 21 is connected inside the hollow body 5 to an annular channel 22, which is formed by an integrally molded-on tube socket 23 and a hollow-cylindrical socket 24 arranged concentrically thereto. Like the socket 24, the tube socket 23 runs coaxial to the common housing axis 25, is integrally molded onto the inside of the end wall 19 of the hollow body 5 and is connected in the delivery region to the inner lying wall 26 of the delivery mouthpiece 20.

While the socket 24 has, referred to the housing axis 25, an approximately twice as long axial extent as the delivery channel 21, the tube socket 23 is provided with a still greater axial length, which exceeds that of the socket 24 approximately by one third. The tube socket 23 is seated with its lower end face 27 on an annular shoulder 28 of the bellows 4. This annular shoulder 28 surrounds a cylindrical annular collar 29, which is integrally molded onto the bellows 4 concentric to the bellows axis coinciding with the housing axis 25 and the wall thickness of which corresponds at least approximately to the width of the annular channel 22. As axial extension, there is integrally molded onto the annular collar 29 a thin-walled, and therefore radially extensible annular wall section 30, which bears in sealing manner, for example with slight press fit, and with a small prestress, against the cylindrical outer annular surface 31 of the socket 24 and, due to its small wall thickness and flexibility, has the possibility of lifting off from the socket 24 in radial direction toward the inside surface of the tube socket 23 and thus of performing the function of the movable valve member of the pump valve on the delivery side.

Since the annular collar 29 fits all around the inside surface of the lower end of the tube socket 23, it establishes a sealtight connection between the annular collar 23 and the bellows 4, which is also ensured whenever an increased pump pressure builds up inside the bellows 4 during the stroke movement of the housing part 1 taking place in the direction of the arrow 32 relative to the housing part 2 on the container side.

In order that the radially flexible annular wall section 30 can be induced to lift off from the annular surface 31 with lower pressure, the socket 24 is provided with three circumferentially evenly distributed slit-shaped clearances 33, which are however kept in their axial length such that they end at least one to two millimeters inside the annular wall section 30, so that the latter bears against the annular surface 31 uninterruptedly all around over the axial length of the two to three millimeters.

In the case of the exemplary embodiment of FIGS. 4 and 5, the two housing parts 1/1 and 2/1 are essentially of the same design as the case of the exemplary embodiment described above of FIGS. 1, 2 and 3. The only difference is that the socket 24 with its cylindrical annular surface 31 is provided over the greatest part of its end section protruding into the radially flexible annular wall section 30 of the bellows 4/1 not with clearances but with a cone 34 tapering in the direction of entry. This cone 34 facilitates the entry of the pasty medium to be delivered, which is inside the bellows 4/1, between the annular surface 31 and the annular wall section 30, so that a lower axial pressure suffices for the radial widening of the annular wall section 30 than if the socket 24 were to be designed cylindrically over its entire length and also not with clearances 33.

In the case of the embodiments of FIGS. 1 to 4, the socket 24 in each case has a round, substantially cylindrical shape and it is provided with slit-shaped clearances and/or with a cone. These embodiments of the socket 24 are suitable primarily for the delivery of liquid or very low-viscosity media. However, experience shows that in the case of pastes of higher viscosity, too high a pressure has to be exerted according to the invention for the flexible annular wall section 30 to lift off from the annular surface 31 of the socket 24 if this annular surface is round, or rather cylindrical.

The housing part 2/1 also has a modification compared with the embodiment of FIGS. 1 and 3 in the region of its back-up ring 11. Instead of a partially concentric housing end wall 12, a planar housing end wall 12/1 is provided, which has four circular outlet openings 16, mutually offset by 90° and lying on a common radius. These outlet openings 16 are in each case covered by tongue-like end wall sections 17/1 of the bellows 4/1. These tongue-like end wall sections 17/1 act as movable valve members of the pump valve on the intake side by closing tightly the passage openings 16 during execution of the pressure stroke of the housing part 1/1 in arrow direction 32, while releasing the passage openings 16, in valve-like manner, for the intake of new medium from the container 3, during the subsequent return movement, effected by the flexible restoring forces of the bellows 4/1, in which a negative pressure is produced inside the bellows 4. Here too, there is a passage opening 18/1 between the tongue-like end wall sections 17/1, but with a different peripheral shape.

In order to ensure that, when the end section on the intake side of the bellows 4/1 is fitted into the back-up ring 11/1, the tongue-shaped end wall sections 17/1 also go into the positions in which they cover in closing manner the passage openings 16, the back-up ring 11/1 is provided with four notch-like clearances 35 and the edge of the bellows 4/1 seated in the back-up ring 11/1 is provided with radially projecting cams 36, which fit into the notch-like clearances 35.

Otherwise, the design and mode of operation are the same as in the case of the embodiment of FIGS. 1 to 3.

However, in order to facilitate still further the lifting-off of the annular wall section 30 from the outer annular surface 31 of the socket 24, at least in certain sections, and thereby also to be able to deliver in metered manner more highly viscous pastes of the metering pump according to the invention with low working pressure, the embodiments of the pump valve on the delivery side represented in FIGS. 1a, 2a, 1b, 2b and 1c are provided.

Figure 2A:
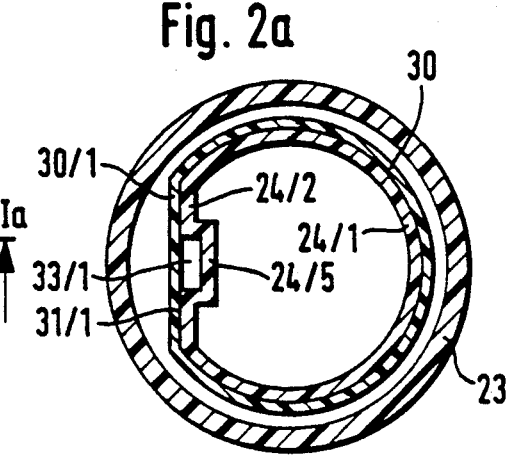

In the case of the embodiment of FIGS. 1a and 2a, the largely cylindrical socket 24/1 is provided on the side directed toward the delivery mouthpiece with a flattened-off, plane wall section 24/2, which has a cross-sectionally rectangular feed channel 33/1. This feed channel 33/1 is formed by a U-shaped wall section 24/5, and it is closed by a flexible annular wall section 30/1 of the bellows 4 bearing against the plane outside surface 31/1. However, if a feed pressure occurs, the annular wall section 30/1 is lifted off from the plane outside surface 31/1, so that paste can push out of the feed channel 33/1 into the delivery mouthpiece 20. Due to the plane outside surface 31/1, against which the flexible annular wall section 30/1 closing the feed channel 33/1 bears, the opening pressure which effects the opening of the feed channel 33/1 is reduced significantly in comparison with the opening pressure which is necessary in the case of the fully cylindrical socket 24 of FIG. 1 and FIG. 4. This is essentially due to the fact that, with a plane bearing surface, the flexible annular wall section to be lifted off radially is subject to a significantly lower adhesive friction and that it is also exposed to a significantly lower stretching or extension than in the case of a cylindrical bearing surface.

Figure 2B:
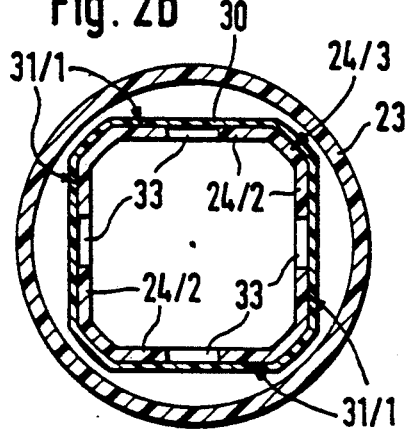
FIG. 2b shows a section IIb—IIb from FIG. 16.
Figure 1C:
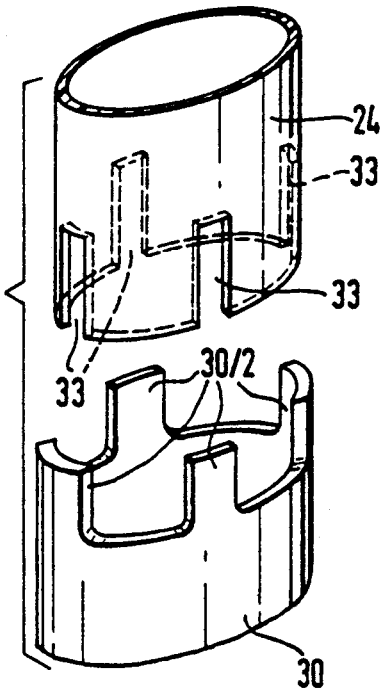
FIG. 1c shows a further embodiment of the connection on the delivery side between the bellows and the movable housing part, in exploded perspective representation.
Figure 1B:
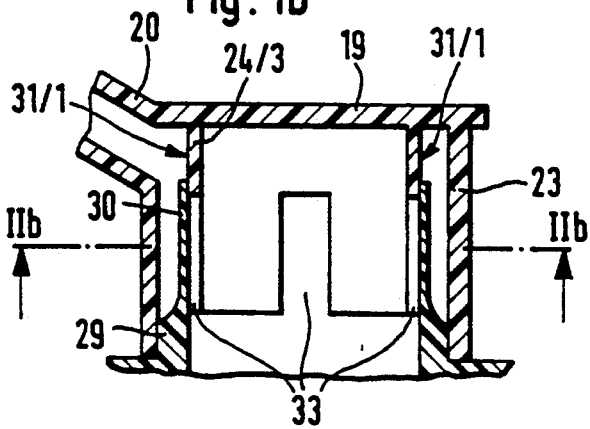
FIG. 1b shows a further embodiment of the connection on the delivery side between the bellows and the second housing part, in section.

In the case of the exemplary embodiment of FIGS. 1b and 2b, the socket 24/3 is of substantially square design and is provided with four plane wall sections 24/2, which in each case have slit-shaped clearances 33 in their center. Instead of the slit-shaped clearances 33, the wall sections 24/2 could have feed channels 33/1, as in the case of the exemplary embodiment of FIGS. 1a and 2a.

In principle, the mode of operation is the same as described in the case of FIGS. 1a and 2a. The fact that the annular collar 29 also has a square cross-sectional shape is not absolutely necessary, but of advantage from an assembly point of view.

As the exemplary embodiment of FIG. 1c shows, a reduction in the working pressure for the opening of the valve on the delivery side is also possible in the case of a cylindrical shape of the socket 24 provided with slit-shaped clearances 33. What is special in this case is that the clearances 33 are not enclosed by a closed ments described above, but by tongue-like axial projections 30/2, which are somewhat wider and longer than the clearances 33. These tongue-shaped projections 30/2 are integrally molded onto the annular wall section 30 of the bellows 4. They thus consist of flexible plastic and can therefore be deflected outward with relatively low radial pressure, so that only a low working pressure is necessary for their actuation in this respect, if a high-viscosity, i.e. viscous medium is to be delivered in a metered manner.

In the case of the embodiment of FIG. 6, the section of a housing part 2/2 enclosing a back-up ring 11/2 and the end section on the intake side of a bellows 4/2 are represented partially, the bellows differing in this region from the two embodiments described above. The back-up ring 11/2 has, similarly to the back-up ring 11 in FIG. 1, a concentric end wall section 14/2, which does not have passage openings however but is provided in its center with a cylindrical annular wall 37, which protrudes at the end into the bellows 4/2 and has a closed end wall 37/1. The annular wall 37 is provided with a number of circumferentially evenly distributed slit-shaped passage openings 38, which end at a distance of at least two to three millimeters from the end wall 37/1.

The bellows 4/2 has a thin-walled, cylindrical hose socket 39, which corresponds to the annular wall section 30, is integrally molded onto its conical end wall section 17 and encloses with flexible contact the outer annular surface 37/2 of the annular wall 37, so that the slit-shaped passage openings 38 are completely closed. The axial length of the hose socket 39 is chosen such that it projects beyond the slit-shaped passage openings 38 by a few millimeters and in this region bears in sealing manner against the annular surface 37/2 of the annular wall 37 uninterruptedly all around.

The annular wall 37 of the housing part 2/2 or of the back-up ring 11/2, respectively, and the hose socket 39 of the bellows 4/2 thus form an intake valve which has the same design in principle and also the same mode of operation in principle as the pump valves on the delivery side of the metering pumps represented in FIGS. 1 to 3 and 4.

It should be mentioned that there are, in a known way, so-called follow-up plungers in the respectively integral on the (sic) housing parts 2, 2/1, 2/2, 2/3, 2/4, 2/6 and 2/7, which in each case execute a follow-up movement against the direction of the arrow 32 during the course of an intake stroke.

In FIG. 6a, a (sic) exemplary embodiments of the two pump valves are represented, in which the socket 24 on the delivery side and also the annular wall 37 on the intake side in each case have an exactly cylindrical shape, but in which the flexible annular wall section 30 and the hose socket 39 of the bellows 4/2 are in each case provided with a conical end section 30/3 and 39/3, respectively, tapering in delivery and intake direction, respectively. While the conical end section 30/3 bears with its inner annular edge linearly or in the form of a narrow, annular surface strip against the annular surface 31 of the socket 24, the conical end section 39/3 of the hose socket 39 is arranged such that it is seated with its inside on the upper annular edge 37/3 of the annular wall 37. In this case, it can also be recognized from FIG. 6a that the inside diameter of the annular wall section 30 is greater than the outside diameter of the socket 24 and that the inside diameter of the hose socket 39 is greater than the outside diameter of the annular wall 37. In order that the medium to be delivered can be taken in from the hollow space 9 of the container 3 into the bellows 4/2, outlet openings 16 are arranged in the housing end wall 12 around the annular wall 37 inside the hose socket 39. It is also readily possible to arrange the conical end section 39/3 such that it bears in sealing manner with its inner annular edge against the circumference of the annular wall 37. The opening pressure is then also greater on the intake side than in the case of the embodiment represented in FIG. 6a. On the intake side, a lower opening pressure is always more advantageous because it has to be applied by the restoring forces of the bellows, by which the movable housing part 1 also has to be pushed back again into the initial position after each working stroke taking place in the direction of the arrow 32.

In FIGS. 6b, 6c and 6d, a further variant of the development of the annular wall section 30 is represented with an end section 30/4 conically tapering in delivery direction. The conical end section 30/4 integrally adjoining the cylindrical annular wall section 30 is profiled in wave form in circumferential direction and provided with an exactly cylindrical opening, the inside surface 30/5 of which bears without any gap and in sealing manner against the cylindrical annular surface 31 of the socket 24. In this case, the wave form is best recognizable from FIG. 6c. This wave-shaped profile of the conical end section 30/4 additionally reduces significantly the force necessary for the lifting-off of the inside surface 30/5 from the annular surface 31, because no material stretching but only a material bending takes place, which is to be achieved with lower force. This embodiment is therefore particularly well suited for viscous media, thus for example high-viscosity pastes. A zig-zag-shaped profile of this conical end section 30/4 can lead to similarly good results.

In the case of the embodiment of FIGS. 7 and 8, a planar housing end wall 12/3 is provided inside a back-up ring 11/3 with a central outlet opening 16/3. In order to close and release this outlet opening 16/3 alternately during the pumping strokes, the bellows 4/3 is provided with a central, circular end wall section 17/3, which is flexibly connected by radial webs 41 to the annular rim part 17/2, with the formation of sector-like passage openings 18/3, and rests in flexibly sealing manner on the rim of the outlet opening 16/3. Here too, the housing end wall 12/3, provided with the outlet opening 16/3, of the housing part 2/3 and the central end wall section 17/3 of the bellows 4/3 form the pump valve on the intake side, the end wall section 17/3 representing the movable valve member.

In the case of the embodiment of FIGS. 9 and 10, the housing end wall 12 of the housing part 2/3 differs from that of FIG. 1 only in that five passage openings 16 of a relatively large diameter are arranged on the one annular half of the conical end wall section 17 and only two passage openings 16/1 of a relatively small diameter are arranged in the other annular half of the end wall section 17. Both the passage openings 16 and the passage openings 16/1 are in this case covered in the same way as in FIG. 1 by the annular end wall section 17, surrounding the passage opening 18, of the bellows 4. This arrangement provides the possibility of charging the container 3 of the housing part 2/4 in the end region, where the passage openings 16/1 provided with the smaller passage cross-section or diameter are arranged, with a pasty medium which differs in color to the quantitively predominant main medium and thus of producing colored stripes of the other-colored medium in the strand of paste leaving the delivery channel 21.

In FIG. 11, it is also shown that the socket 24 of the movable housing part 1/4 can be provided at its end protruding into the annular wall section 30 of the bellows 4/4 with an end wall 60, so that it has overall a pot-like or peg-like form. In order not to allow any empty hollow space to occur in the socket 24, for reasons of technical operation, a plurality of thin-walled cross walls 61 are formed in its interior, the end surfaces 62 of which walls offer an area of application with good grip during actuation of the housing part 1/4. The sockets 24 on the metering pumps of FIGS. 1 and 4 or 6a and 6b, as well as in the case of the examples described below of FIGS. 12 to 18 and 25 to 28, could also be designed similarly.

The metering pumps represented in FIGS. 12 and 13 and 14 and 15 are embodiments which are also intended, or primarily intended, for the delivery of liquid media and are designed for screwing onto the threaded neck of a tube-like, bottle-like or can-like container.

They also consist substantially of two cylindrical housing parts 1/4 and 2/4 or 2/5, respectively, as well as a bellows 4/4 or 4/5, respectively. While the two housing parts 1/4 and 2/4 or 2/5 are in each case produced integrally in the injection-molding process from hard, dimensionally stable plastic, the bellows 4/4 and 4/5 are in each case of a soft, dimensionally flexible plastic, which is at the same time capable of exerting the restoring forces necessary for the pumping operation.

The housing part 1/4 is made up of a cylindrical hollow body 5/4, an end wall 19, a delivery mouthpiece 20/4, directed radially and obliquely outward with respect to the container axis 25, a tube socket 23 arranged concentrically to the housing axis 25 and a cylindrical socket 24 arranged concentrically therein. The tube socket 23 and the socket 24 form between themselves the annular channel 22, which also exists in the case of the embodiments of FIGS. 1 to 5 and which is in connection with a delivery channel 21/4 of the delivery mouthpiece 20/4. The socket 24 and the tube socket 23 differ from the socket 24 and the tube socket 23 of FIG. 1 only in that they both have greater diameters. Correspondingly, the annular collar 29 of the bellows 4/4 and the thinner radially extensible annular wall section 30 are in each case provided with a greater outside or inside diameter, respectively, such that the annular collar 29 bears in sealing manner against the lower section of the inside surface of the tube socket 23 and the annular wall section 30 bears against the outer annular surface 31 of the socket 24. The socket 24 is provided at its end section protruding into the annular wall section 30 with a small cone 34/1, which has the same function as the cone 34 of the socket 24 in the case of the metering pump of FIG. 4. In the case of the embodiments of FIGS. 12 and 14 as well, the wall thickness of the annular collar 29 is the same size as the radial width of the annular channel 22, and the wall thickness reduction of the flexible annular wall section 30 is produced by a corresponding reduction in the outside diameter.

It is apparent from the drawing that the inside diameter of the annular collar 29 is of a size which is between the inside diameter and the outside diameter of the foldable folding section of the bellows 4/4. As a result, account is taken of the fact that the end section on the intake side of the bellows 4/4 in these two embodiments of FIGS. 12 and 13 and 14 and 15 is in each case provided with an end wall which does not have any central opening like the bellows 4 and therefore has to be ejected in the opposite axial direction. This also applies to the bellows 4/2 and 4/3 represented in FIGS. 6 and 7, of which in each case only the end sections on the intake side are shown however. On the metering pumps of FIGS. 12, 13 and 14, 15 as well, the flexible annular wall section 30 of the annular collar 29 represents, in interaction with the outer, cylindrical annular surface 31 of the socket 24, the pump valve on the delivery side, automatically opening when pressure occurs inside the bellows 4/4 and then closing again.

The end section on the intake side of the bellows 4/4 protrudes into a cylindrical guide part 6/4, of substantially greater diameter, of the housing part 2/4 or 2/5, which is guided telescopically displaceably in the cylindrical hollow body 5/4 and to which a threaded coupling 49, reduced slightly in outside diameter and provided with an internal thread 48, is integrally molded on. Integrally molded onto a partition 10/4 between the guide part 6/4 and the threaded coupling 49 is a concentric back-up ring 11/4, which has a smaller diameter than the guide part 6/4 and projects axially against the bellows 4/4. This back-up ring 11/4 is provided in FIG. 12 with a housing end wall 12/4, which has a conical annular section 14/4 and a planar, inner section 13/4 with a downwardly directed hose connection socket 55.

The bellows 4/4 has an integrally molded-on circular end wall section 17/4, which is adapted to the profile of the housing end wall 12/4, consequently rests in sealing manner on the upper side of the latter and, as FIG. 13 shows best, closes the bore 58 of the hose connection socket 55 and is surrounded by four sector-like passage openings 18/4, through which the preferably liquid medium taken in through the bore 58 can pass into the interior of the bellows 4/4 during the intake operation. Here too, as in the case of the embodiment of FIGS. 7 and 8, the circular end wall section 17/4 is connected to a conical end wall section 17 by radial webs 41.

In the case of the embodiment of FIGS. 14 and 15, the bellows 4/4 is provided at its end section on the intake side with a planar, ring-like end wall section 17/5 having round passage openings 18/5. The partition 10/1 has a back-up ring 11/5 with a likewise planar housing end wall 12/5 having a hose connection socket 55/1, which is provided at its upper end with a conical extension 55/2, into which a nipple-like projecting hollow end wall section 17/6 of the bellows 4/5 protrudes with sealtight contact. Arranged around this end wall section 17/6, as can be recognized best from FIG. 15, are the circular passage openings 18/5, which have the same function as the passage openings 18/4 in the case of the exemplary embodiment of FIGS. 12 and 13.

In order to effect a metered delivery of the medium located for example in the container 3 or in a bottle, the respectively upper housing part 1, 1/1 or 1/4 is moved axially relative to the respectively lower housing part 2, 2/1, 2/3 or 2/5 in the direction of the arrow 32, and the bellows 4, 4/1, 4/2, 4/3, 4/4 or 4/5 is thereby compressed. The accompanying volume reduction and pressure increase in the bellows 4 to 4/5 have the effect that the greatest part of the medium in the bellows 4 to 4/5 is conveyed through the extending or opening annular wall section 30, 30/1 or conical end section 30/3, 30/4 into the annular channel 22 and through the delivery channel 21 or 21/4 to the outside. If the upper housing part 1, 1/1 or 1/4 is then again released and returned into its initial position by the bellows 4 to 4/5, the negative pressure produced in the bellows causes the annular wall section 30, 30/1 or its conical end section 30/3 or 30/4 to move back again, in a closing manner, against the annular surface 31 or 31/1, respectively. At the same time, however, the passage openings 16, 16/1, 16/3, 38 or 58 is or are opened on the intake side by the flexible end wall sections 17, 17/1, 17/3, 17/4, 17/6 or the hose socket 39, so that further medium flows into the bellows 4 to 4/5. During the subsequent pressure stroke, the end wall sections 17, 17/1, 17/3, 17/4, 17/6 or the hose socket 39 are again pressed in a closing manner against the underlying annular surfaces.

In the case of the metering pump represented in FIGS. 16, 17 and 18, there is molded onto a partition 10/6 of a housing part 1/6, provided with an integrally molded-on container 3, eccentrically to the housing axis 25, an intake socket 50, protruding downwards into the hollow space 9 of the container 3 and having an inner cone 51, which serves as annular valve seat surface. Concentric to the axis 52 of the intake socket 50, there is molded-on on the opposite side of the latter an annular wall 11/6 with a radial annular shoulder 14/6, which runs on the inside of a back-up ring 11/7. Diametral to the housing axis 25, there is molded-on on the side opposite the intake socket 50, on the outside of the partition 10/6, a delivery mouthpiece 20/6 in the form of a nozzle connection, the axis 53 of which runs parallel to the housing axis 25 and thus also parallel to the axis 52 of the intake socket 50. As is apparent from FIG. 17, the delivery channel 21/6 of the delivery mouthpiece 20/6 has a substantially rectangular cross-section. At the upper end, this delivery mouthpiece 20/6 has, in its planar outer wall 54, a radially outwardly directed delivery opening 56, which is closed or can be closed by an axially movable closing wall 57.

The delivery channel 21/6 is in connection, through a radial connecting channel 59, with the interior 63 of the annular wall 11/6 and, via the latter, through the bore 58/6 of the intake socket 50, with the interior 9 of the container 3.

Seated in sealing manner on the annular shoulder 14/6 is an annular end wall section 17/7 of a bellows 4/6. This end wall section 17/7 is in flexible connection, by radial webs 41/6 (FIG. 17), with a pot-shaped end wall section 17/8, which forms the axially movable valve part of the pump valve on the intake side and, in the closed position represented in FIG. 16, bears in sealing manner against the inner cone 51 of the intake socket 50. The pot-shaped end wall section 17/8 is surrounded by annular segment-like passage openings 18/6, through which the interior 63 of the annular wall 11/6 is in connection with the interior of the bellows 4/6.

At its upper end, the bellows 4/6 has a sleeve-shaped, cylindrical annular wall section 30/6, which encloses a hollow-cylindrical socket 24/6 of a housing part 1/6 designed as a pushbutton with such a radial prestress that this prestress withstands the maximum pump pressure occurring inside the bellows 4/6, in other words does not lift off radially. However, during filling of the container 3, the bellows 4/6 and the delivery channel 21/6 are also filled with medium. This takes place at a high enough filling pressure for the air in the bellows 4/6 to be pressed to the outside by the annular wall section 30/6 lifting off slightly from the socket 24/6. In order to be able to empty the bellows 4/6 at least virtually completely during a pumping stroke taking place in the direction of the arrow 32, the hollow-cylindrical socket 24/6 is provided with a pot-shaped displacement body 64, which is graduated in several stages corresponding to the cross-sectional profile of the lower bellows section and the greatest outside diameter of which corresponds approximately to the inside diameter of the foldable section of the bellows 4/6. The cylindrical opening produced by injection molding at the upper end of the socket 24/6 is closed by a fitted cover part 65 having grip ribs 66.

As can be recognized from FIG. 16, the housing part 1/6 consists of a cylindrical guide section 6/6, which is displaceably guided telescopically axially between two stroke limitations in a guide cylinder 7/6 of the housing part 2/6. The closing wall 57 for the delivery opening 56 of the delivery mouthpiece 20/6 is integrally molded onto the cylindrical guide section 6/6. At its lower rim, the guide section 6/6 is provided with an annular rib 6/7 running around the outside, which forms the upper stroke limitation with the rim 7/7, crimped all around, of the guide cylinder 7/6. The lower stroke limitation is formed by stop ribs 7/4 in interaction with the lower rim of the guide section 6/6 or of the housing part 1/6. The end wall 19/6, likewise integrally molded onto the guide section 6/6, is provided with an opening which encloses sealtightly around the delivery mouthpiece 20/6 designed as nozzle connection and through which the upper end of the delivery mouthpiece 20/6 projects. It can be appreciated that the closing wall 57 opens the delivery opening 56 during the pumping stroke movement of the housing part 1/6 taking place in the direction of the arrow 32. In this pumping stroke movement, the medium inside the bellows 4/6 is pressed through the passage openings 18/6 into the connecting channel 59 and through the latter into the delivery channel 21/6 or through the delivery opening 56 to the outside. During the following intake stroke, in which the housing part 1/6 is moved back again, counter to the direction of the arrow 32, into the initial position represented in FIG. 16, a renewed intake of medium from the hollow space 9 of the container 3 takes place, through the bore 58/6 of the intake socket 50 and through the passage openings 18/6 into the interior of the bellows 4/6. The fact that medium is not at the same time sucked backwards out of the delivery channel 21/6 into the bellows 4/6 is due on the one hand to the fact that the delivery opening 56 is closed during the intake stroke and due to the fact that the viscosity of the pasty medium and the cross-section/length ratio of the delivery channel 21/6 and the relatively small cross-section of the connecting channel 9 oppose backward flowing in the delivery channel 21/6 with a great resistance.

It is also conceivable to design the lower end section of the bellows 4/6 such that its pot-like end wall section 17/8 fills the entire interior of the annular wall 11/6 and covers a bore of somewhat smaller diameter of a continuously cylindrical intake socket in such a way that the passage openings 18/6 rest directly on the planar surface surrounding the bore of the intake socket. In this case, a radial aperture would then have to be arranged in the annular wall of the pot-shaped end wall section 17/8 at the place where the connecting channel 59 is located.

In the case of the paste dispenser represented in FIG. 19, an upper, axially movable housing part 1/7 is provided, which has a cylindrical shape overall and possesses a cylindrical guide section 6, by which it is guided in the guide cylinder 7/6 of a second housing part 2/7. The housing part 1/7 is provided with an upper closed end wall 19/7 and with a radially obliquely upwardly running delivery mouthpiece 20/7, the delivery channel 21/7 of which is connected to the interior 67 of a cylindrical, tubular socket 24/7, molded concentrically to the housing axis 25 onto the inside of the end wall 19/7. As pumping member, here again a bellows 4/6 is provided, the upper cylindrical annular wall section 30/6 of which encloses the tube socket 24/7 in fixed manner in the same way as the annular wall section 30/6 encloses the socket 24/6 in FIG. 16, i.e. in such a way that the annular wall section 30/6 bears against the circumference of the tube socket 24/7 with such a prestress that it withstands the normal pumping pressure. The annular wall section 30/6 thus does not act as a valve. The lower end section of the bellows 4/6 is designed precisely the same as in the case of the exemplary embodiment of FIG. 16. A planar end wall section 17/7 is in this case seated on an annular shoulder 14/7, which is integrally molded onto the inside of a back-up ring 11/7 of the partition 10/7 of the housing part 2/7. The pot-shaped end wall section 17/8 serves here as valve part, in interaction with an inner cone 51 of an intake socket 50, and closes the bore 58/6 of the latter.

As the frontal views of the discharge channel 21/7 represented in FIGS. 20, 21 and 22 show, there is attached to the inner end of the delivery channel 21/7 a partition 68, which according to FIG. 20 has star-shaped or according to FIG. 21 circular and semicircular or according to FIG. 22 slit-shaped apertures 69, 70 and 71, respectively, and which prevents a backward flowing of the pasty medium already in the delivery channel 21/7 into the interior 67 or into the bellows 4/6. This partition 68, with its apertures of reduced cross-section compared with the cross-section of the delivery channel 21/7, thus acts as a reversing brake. Such a reversing brake may also have the form represented in FIGS. 23 and 24, in which the rear section of the delivery channel 21/7 is provided with cross-sectionally constricting conical ribs 72.

The mode of operation of the metering pump represented in FIG. 19 is thus: during a delivery stroke in the direction of the arrow 32, compressing the bellows 4/6, a corresponding quantity of the medium inside the bellows 4/6 and in the hollow space 67 is pressed through the partition 68 or through the delivery channel 21/7 to the outside. During the following upward movement of the housing part 1/7 against the arrow direction 32, further medium is taken in from the hollow space 9 of the container 3 through the intake socket 50 and through the passage openings 18/6 into the bellows 4/6. At the same time, the wall 68 and the conical ribs 72 effect a backflow restriction of the medium in the delivery channel 21/7.

If the delivery channel 21/7 is given an adequate axial length and/or a smaller cross-section, under certain circumstances it is possible to dispense with the constricting means in the form of the wall 68 or of the wedge-shaped ribs 72.

The two spray pumps represented in FIGS. 25 to 27 and 28 to 30, respectively, are intended specifically for the spraying of liquid media. They too in each case consist of two housing parts 1/8 and 2/8 or 2/9, respectively, and a bellows 4/8 or 4/9, respectively. The housing part 1/8 in turn consists of a cylindrical hollow body 5/8 with a guide section 6/8 which has a slightly increased diameter and, like the other examples, is movably guided telescopically axially in a guide cylinder 7/8 of the housing part 2/8 or 2/9 between two stroke limitations. In a radially projecting cylindrical nozzle connection, which forms the delivery mouthpiece 20/8, a spray nozzle 73 is fitted, which has a narrow spray opening 74 and is provided inside this spray opening with a partially annular swirling space 75. This swirling space 75 is in connection via a wall aperture 76 with an annular channel 77, which is formed between the cylindrical outside wall 78 and a likewise cylindrical socket 24/8, protruding concentrically from the end wall 19/8 into the inside of the housing part 1/8. As in the case of the exemplary embodiments described above, here too the outer annular surface 31/8 of the socket 24/8 is enclosed by an annular wall section 30/8 which is in sealtight contact with a certain prestress and forms the upper end section of the bellows 4/8 and at the same time the movable closing member of the pump valve on the delivery side. In the common radial center plane 78 of the spray nozzle 73, the socket 24/8 is provided with an axially running feed channel 79, which ends axially inside the radially flexible annular wall section 30/8 of the bellows 4/8, so that the upper end section of the annular wall section 30/8 encloses the closed cylindrical circumferential surface 31/8 over an axial length of at least 1 to 2 mm.

In order that none of the liquid to be sprayed can get out of the annular channel 77 into the inside of the housing part 1/8, the annular wall section 30/8 is provided with a sealing lip 80 running around its circumference, which lip bears in sealing manner against the cylindrical inside surface of the hollow body 5/8 and at the same time engages underneath an inwardly projecting annular shoulder 81 of this hollow body 5/8.

In the case of the spray pump of FIG. 29, the annular wall section 30/8 of the bellows 4/9 is provided not with a sealing lip 80 but with a sealing rib 80/1 running around it, which bears in sealing manner against the wall of the hollow body 5/9 between the annular shoulder 81 and a supporting rib 81/1 arranged around the inside of the hollow body 5/9. The supporting rib 81/1 ensures that the axial position of the annular wall section 30/8 is not changed on the socket 24/9 if there builds up in the annular channel 77 a high pressure having the tendency to push the annular wall section 30/8 down in the direction of the arrow 32 from the socket 24/9. In order that, during assembly, the annular rib 80/1 can yield radially inwards, when it is pushed over the supporting rib 81/1, the lower section of the socket 24/9 is conically tapered, so that an air gap 80/3 is produced between the annular wall section 30/8 and the circumferential surface 31/8 of the socket 24/9 on a level with the annular rib 80/1.

It can be recognized from FIGS. 25 and 29 that the outside diameter of the cylindrical socket 24/8 is approximately of the same size as the outside diameter of the foldable, zig-zag-shaped part of the bellows 4/8 and that there adjoins this socket, which is otherwise of hollow-cylindrical design, via a conical section 82, a hollow-cylindrical displacement body 83, which is longer than the foldable, zig-zag-shaped part of the bellows 4/8 and which protrudes with its lower end section into a cylindrical extensible wall section 84, which is integrally molded onto the foldable part of the bellows 4/8, running concentrically thereto. In this case, the displacement body 83 has an outside diameter which is approximately 0.3 to 0.8 mm smaller than the inside diameter of the cylindrical extensible wall section, so that liquid can flow through between the wall of the extensible wall section 84 and the circumferential surface of the displacement body 83. The wall of the extensible wall section 84 also has a greater thickness than the foldable section and the annular wall section 30/8. The extensible wall section 84 also has a smaller inside diameter than the annular wall section 30/8, at the same time performing the function of a valve part. The extensible wall section 84 is seated with its lower end section 84/1 in a cylindrical back-up ring 11/8, which is a component part of a partition 10/8 of the housing part 2/8. This back-up ring 11/8 is arranged concentrically to the housing axis 25. On the opposite side, the partition 10/8 is provided with a hose connection socket 55, the bore 58 of which is connected through a central outlet opening 18/8 to the interior of the back-up ring 11/8. This outlet opening 18/8 is, however, covered flexibly in sealing manner by a thin-walled annular wall section 17/8. In this end wall section 17/8 there are, as can be recognized from FIG. 28, a plurality of outlet openings 18/8, on a common radius, through which openings the liquid taken in through the hose connection socket 55 and the outlet opening 16/8 can pass into the inside of the bellows 4/8 or of the extensible wall section 84 whenever a suction stroke of the bellows takes place. In the opposite direction of movement, in other words during the pressure or delivery stroke taking place in the direction of the arrow 32, the outlet opening 16/8 is closed sealtightly by the end wall section 17/8. It is achieved with the aid of the extensible wall section 84 and the radial stress by which the annular wall section 30/8 bears against the circumferential surface 31/8 of the socket 24/8 that a liquid outlet from the feed channel 79 into the annular channel 77 and into the spray nozzle 73 does not take place until a pressure of, for example, 6 bar, which is sufficient to effect an immediate spraying of the liquid emerging from the spray opening 74 of the spray nozzle 73, has built up in the bellows 4/8 and at the same time in particular in the extensible wall section 84 during the pressure stroke. During the pressure build-up, the extensible wall section 84 extends in radial direction by a certain amount until the radial stress is greater than the prestress of the annular wall section 30/8 bearing against the annular surface 31/8 in the region of the feed channel 79. Due to the zig-zag form of the foldable section of the bellows 4/8, the radial extension resistance is too great, in particular if the folds have already been somewhat compressed, to allow creation there of a radial extension for the necessary spray pressure. The displacement body serves primarily to reduce the hollow space in the bellows 4/8 and thus to reduce the quantity delivered per pumping stroke.

For the sake of completeness, it should also be mentioned that the hollow space of the socket 24/8 is closed by a cap 85, which is seated on axial ribs 86.

On the housing part 2/8, a screw cap 86 of greater diameter and provided with an internal thread is concentrically molded on, by which cap the complete metering pump can be screwed, for example, onto the neck of a container in the form of a bottle or can, provided with a suitable external thread. In order that the suction strokes of the bellows 4/8 do not produce any negative pressure inside the container, the partition 10/8 is provided with vent openings 87, through which air can flow from the interior of the housing part 2/8 into the container. This interior of the housing part 2/8 is in constant connection with the outside atmosphere through the annular gap (annular play) between the guide section 6/8 of the housing part 1/8 and the guide cylinder 7/8 of the housing part 2/8. In order that, however, no liquid can penetrate through the vent openings 87 into the interior of the housing part 2/8 during the pressure or delivery strokes, during which the housing part 1/8 is pushed in the direction of the arrow 32 into the guide cylinder 7/8, a sealing lip 88 is integrally molded on around the outside of the extensible wall section 84 of the bellows 4/8, in the manner of a shield, directly above the back-up ring 11/8, which lip bears against an inside surface, constricted slightly in its lower region, of the housing part 2/8 such that it forms a one-way valve, which allows air to flow through downward but prevents air flow upward.

In the case of the exemplary embodiment of FIGS. 29 and 30, the partially cylindrical and partially conical socket 24/9 on a level with the first fold of the foldable section of the bellows 4/9 is closed off by a closed end wall 90 and not provided with an integrally molded-on displacement body, as is the case with the spray pump of FIGS. 25 to 28. Instead, a cylindrical, solid displacement body 91, consisting of plastic and of cylindrical form, is arranged axially movably in the bellows 4/9, likewise provided with an extensible wall section 84, which body virtually completely fills the hollow space of the cylindrical extensible wall section 84 with a radial play of approximately 0.2 to 0.4 mm and has essentially the same function as the displacement body 83 in the spray pump of FIG. 25. Both displacement bodies 83 and 91 are designed such that they virtually completely fill the hollow space of the entire bellows 4/8 and 4/9, respectively, which is after all substantially longer than the maximum working stroke or intake stroke, when the housing part 1/8 and 1/9, respectively, is completely pressed, in order that as little air or liquid as possible can remain inside the bellows 4/8 and 4/9, respectively.

While the displacement body 83 is designed as a hollow body and is provided with a closing end wall 83/1, the solid displacement body 91 has on its lower end face a central, conical valve plug 92, which protrudes into a central outlet opening 16/8 of the partition 10/8 and at the same time into a central passage opening 18/9, of the same size in diameter, of the end wall 17/10 of the bellows 4/9 and closes the latter opening during the working stroke of the upper housing part 1/9 of the arrow 32, but opens this opening during the following intake stroke taking place in the opposite direction.

In order that the displacement body 91 is not freely movable in axial direction between the end wall 17/10 and the end wall 90 within the bellows 4/9, it is provided on its upper end section with an annular rib 91/9 protruding into the outwardly directed lowermost fold of the foldable section of the bellows. It is ensured in this way that the displacement body 91 always executes its valve function with its valve plug 92, it generally being safe to assume that the spray pump is held during use in vertical position of its housing axis 25 and the displacement body 91 is held in closed position by its own weight.

In the case of all embodiments described above, the main feature is realized that the complete metering and spray pump consists of a minimum number of different, separately produced individual parts, namely substantially of two housing parts and a bellows, and that the connections between the bellows and the housing parts are formed by integrally molded-on parts of the bellows, which at the same time perform valve functions. As a result, a minimum of both individual parts and material as well as of assembly costs is achieved, without reducing the functional quality, in particular the valve characteristics, in comparison with the known metering pumps.

By simply putting together the few individual parts in the way described, sealtight connections between certain component parts of the housing parts 1 to 1/9 and 2 to 2/9, on the one hand, and the bellows 4 to 4/9, on the other hand, and at the same time the two pump valves are also formed.

I claim:

1. A pump for dispensing metered quantities of flowable materials from containers of the kind comprising a resilient, flexible, tubular plastics bellows, first and second rigid plastic housing parts telescopically coupled together trapping the bellows between them for reciprocating pumping movement of the first housing part towards and away from the second housing part between two stroke positions producing axial flexure of the bellows, the resiliency of which restores the first housing part away from the second housing part, the bellows having an intake end, provided with a pump valve with a movable closure member, which is arranged to be automatically opened in an intake direction and closed in a return direction during the respective pumping strokes of the first housing part away from and towards the second housing part, one housing part being provided with a dispensing mouthpiece and one housing part connecting to a container, wherein the improvement comprises an axially closed annular wall integrally molded on the first housing part, a radially flexible, annular wall section molded on the bellows extending axially from the other axial end thereof and enclosing the annular wall in sealing engagement with a perimetrical surface thereof during the pumping stroke of the first housing part away from the second housing part, and the second housing part having an end wall provided with at least one outlet opening and an end wall section integrally molded on the intake, axial end of the bellows, which end wall section has at least one opening for passage of flowable material and a valve closure member operable to close sealingly said at least one outlet opening, the end wall section of the bellows comprising an annular portion with a flexible hose socket integrally molded thereon, protruding into the intake end of the bellows, the end wall of the second housing part being formed with an upstanding annular wall which protrudes into the intake end of the bellows and is closed at an upper end by an end wall and is provided with radial passage openings, the hose socket releasably engaging the annular wall in a tight fit covering the radial passage openings.

2. A pump for dispensing metered quantities of flowable materials from containers of the kind comprising a resilient, flexible, tubular plastics bellows, first and second rigid plastic housing parts telescopically coupled together trapping the bellows between them for reciprocating pumping movement of the first housing part towards and away from the second housing part between two stroke positions producing axial flexure of the bellows, the resiliency of which restores the first housing part away from the second housing part, the bellows having an intake end, provided with a pump valve with a movable closure member, which is arranged to be automatically opened in an intake direction and closed in a return direction during the respective pumping strokes of the first housing part away from and towards the second housing part, one housing part being provided with a dispensing mouthpiece and one housing part connecting to a container, wherein the improvement comprises an axially closed annular wall integrally molded on the first housing part, a radially flexible annular wall section molded on the bellows extending axially from the other axial end thereof and enclosing the annular wall in sealing engagement with a perimetrical surface thereof during the pumping stroke of the first housing part away from the second housing part, and the second housing part having an end wall provided with at least one outlet opening and an end wall section integrally molded on the intake axial end of the bellows, which end wall section has at least one opening for passage of flowable material and a valve closure member operable to close sealingly said at least one outlet opening, the perimetrical surface of the annular wall engaging the flexible annular wall section of the bellows being interrupted by one of an axial feed channel and a slit-shaped clearance for the passage of flowable material.

3. A pump as claimed in claim 2, wherein the perimetrical surface has planar wall sections forming a substantially square cross-sectional shape and the said one of an axial feed channel and slit-shaped clearance is formed in the center of at least one of said planar wall sections.

4. A pump for dispensing metered quantities of flowable materials from containers of the kind comprising a resilient, flexible, tubular plastics bellows, first and second rigid plastic housing parts telescopically coupled together trapping the bellows between them for reciprocating pumping movement of the first housing part towards and away from the second part between two stroke positions producing axial flexure of the bellows, the resiliency of which restores the first housing part away from the second housing part, a movable closure member, which is arranged to be automatically opened in an intake direction and closed in a return direction during the respective pumping strokes of the first housing part away from and towards the second housing part, one housing part being provided with a dispensing mouthpiece and one housing part connecting to a container, wherein the improvement comprises an axially closed annular wall integrally molded on the first housing part, a radially flexible, annular wall section molded on the bellows extending axially from the other axial end thereof and enclosing the annular wall in sealing engagement with a perimetrical surface thereof during the pumping stroke of the first housing part away from the second housing part, and the second housing part having an end wall provided with at least one outlet opening and an end wall section integrally molded on the intake, axial end of the bellows, which end wall section has at least one opening for passage of flowable material and a valve closure member operable to close sealingly said at least one outlet opening, the annular wall of the first housing part being formed with axially extending slots covered by the annular wall section of the bellows.

5. A pump for dispensing metered quantities of flowable materials from containers of the kind comprising a resilient, flexible, tubular plastics bellows, first and second rigid plastic housing parts telescopically coupled together trapping the bellows between them for reciprocating pumping movement of the first housing part towards and away from the second housing part between two stroke positions producing axial flexure of the bellows, the resiliency of which restores the first housing part away from the second housing part, the bellows having an intake end, provided with a pump valve with a movable closure member, which is arranged to be automatically opened in an intake direction and closed in a return direction during the respective pumping strokes of the first housing part away from and towards the second housing part, one housing part being provided with a dispensing mouthpiece and one housing part connecting to a container, wherein the improvement comprises an axially closed annular wall integrally molded on the first housing part, a radially flexible annular wall section molded on the bellows extending axially from the other axial end thereof and enclosing the annular wall in sealing engagement with a perimetrical surface thereof during the pumping stroke of the first housing part away from the second housing part, and the second housing part having an end wall provided with at least one outlet opening and an end wall section integrally molded on the intake, axial end of the bellows, which end wall section has at least one opening for passage of flowable material and a valve closure member operable to close sealingly said at least one outlet opening, the flexible annular wall section of the bellows having a valve member formed by at least one tongue-shaped axial projection covering one of a slit-shaped clearance and feed channel formed in the annular wall of the first housing part.

* * * * *